United States Patent Office 3,830,870
Patented Aug. 20, 1974

---

3,830,870
METHOD OF ISOMERIZING BUTENE-1 TO BUTENE-2
Mark A. Harter, deceased, late of Midland, Mich., by Jo Ann Harter, executrix, Midland, Mich., and John R. Frost, and Robert A. Stowe, Midland, Mich., assignors to The Dow Chemical Company, Midland, Mich.
No Drawing. Filed Mar. 5, 1973, Ser. No. 337,939
Int. Cl. C07c 5/22
U.S. Cl. 260—683.2                                  7 Claims

ABSTRACT OF THE DISCLOSURE

Butene-1 in a mixed stream containing isobutene is isomerized to butene-2, by passing the mixture over a strontium-nickel phosphate catalyst at a temperature of 150–440° C.

BACKGROUND OF THE INVENTION

Butene-1 (b.p. −6.3° C.) and isobutene (b.p. −6.9° C.) can be found in hydrocarbon streams from several sources, e.g., petroleum cracking effluent streams for producing gasoline or naphtha cracker effluent streams which also contain ethylene and propylene. Each of butene-1 and isobutene is a desirable raw material, the former for dehydrogenation to butadiene and the latter for preparing aromatic alkylate useful as a gasoline component or for preparing octanes by controlled dimerization. However, because of the closeness of the boiling points of butene-1 and isobutene, separation by distillation is extremely difficult. Other physical separating means are uneconomical, as are chemical separations which depend on conversion of the olefinic unsaturation to form derivatives, e.g., hydration to alcohols, halogenations, etc. A procedure which will alter the physical characteristic of one component of the olefinic $C_4$ mixture without appreciable change in chemical structure to permit separation by distillation is a novel solution to the problem.

It is to be understood that the isomerization reaction is time-temperature dependent. At comparatively low temperatures of about 150° C., a low space velocity (STP) or high retention time is needed to attain appreciable conversion. At comparatively high temperatures, the space velocity should also be high, i.e., the retention time should be low to attain optimum conversion and selectivity of the reaction. Thus, a preferred temperature range is from about 260 to about 410° C. at a space velocity of from about 175 to about 225 and a more preferred temperature range at this above indicated space velocity is from 325 to about 400° C.

SUMMARY OF THE INVENTION

It has been found that if a mixture of 1-butene and isobutene is passed over a strontium-nickel phosphate catalyst at a temperature of 260–440° C., preferably 300–400° C., and a space velocity of 25–800 v./v./h. (STP), without need for steam, oxygen or other reactant, 1-butene is isomerized to a mixture of cis and trans 2-butene (b.p. 3.6 and 0.9° C., respectively) while the isobutene remains substantially unchanged under these conditions.

The 2-butenes thus can be separated from the cooled reactor effluent by careful fractionation. Steam or other diluent is not needed, but if one is added to the 1-butene isobutene mixture entering the reaction, it should be inert under the conditions of the reaction.

At a temperature of about 235° C. and a space velocity of about 190 (STP), isomerization is detectable but conversion of 1-butene to 2-butene is low. Below about 235° C. at this space velocity, substantially no isomerization of 1-butene occurs. At temperatures above about 440° C., the feed mixture tends to undergo considerable cracking, as evidenced by increasing methane production.

The space velocity can range from about 25 to about 800 v./v./h. calculated at STP.

Pressure, per se, seems to have no effect on the isomerization so that subatmospheric, atmospheric or superimposed pressures can be employed. Preferably, the process is operated at autogenous pressure. However, it is possible to control space velocity by controlling pressure, and therefore this means of space velocity control can be used if desired. One unusual feature of this invention is that under the operating conditions described, there is extremely little dimerization or trimerization of isobutene. Typically, the polymerization of isobutene is less than ¼ of 1%.

The strontium-nickel phosphate and its method of preparation are disclosed in detail in U.S. Pat. 3,541,172, which is incorporated herein by reference.

The following examples are intended to illustrate but not limit the invention. Parts or percentages are given in moles unless otherwise specified.

EXAMPLE 1

Strontium-nickel phosphate catalyst, prepared and dried according to the methods disclosed in U.S. Pat. 3,541,172, was ground to pass a No. 12 screen. Ninety-eight parts by weight of the powder, 2 parts of $Cr_2O_3$ and 3 parts of graphite were blended together and formed into 3/16 x 3/16 inch pellets. The graphite lubricant was removed by roasting in steam (3700 v./v./h. STP) and air (450 v./v./h. STP) at 650° C. for 6 hours. Thirty cc. of the pellets (30 g.) were packed into a 4 foot by 1 inch diameter Vycor glass reactor having a 5/32 inch diameter thermowell axially positioned. The reactor was heated electrically to 375° C. and a feed gas was passed through the catalyst bed at a rate of 100 ml. per minute, which is equivalent to a space velocity of 200 v./v./h. Both the feed and product gas samples were analyzed by gas phase chromatography. Tabulated below are data from this run.

| Component | Feed gas, mole percent | Process effluent, mole percent |
|---|---|---|
| Air—$CH_4$—CO | 0.2 | 0.3 |
| Isobutane | 2.8 | 2.9 |
| n-Butane | 8.2 | 8.1 |
| 1-butene | 21.1 | 16.8 |
| Isobutylene | 50.8 | 50.3 |
| Trans 2-butene | 10.0 | 12.0 |
| Cis 2-butene | 6.4 | 9.4 |
| 1,3-butadiene | 0.5 | 0.4 |

It is noted that the catalyst action produces a 20% conversion of the 1-butene to its isomer and that no appreciable amounts of isobutylene were lost. Although the data shows a 1% reduction in the isobutylene, no dimers or trimers were present in the effluent. If desired, the reaction mixture can be fractionated by conventional means and the isobutene-1-butene cut can be recycled through the catalyst until substantially all the 1-butene is converted to cis and trans 2-butene.

EXAMPLE 2

A series of runs was made in which the temperature was varied but a constant space velocity of about 189 v./v./h. STP was maintained. The reactor and the catalyst were the same as described in Example 1 and the feed composition was similar. Below about 235° C. there was no perceptible isomerization of 1-butene to 2-butene.

Results obtained at 355° C. are compared with the feed gas composition in the table below.

| Component | Feed gas, mole percent | Process effluent, at 355° C. mole percent |
|---|---|---|
| Air—CH$_4$—CO | 0.76 | 0.73 |
| Isobutene | 3.34 | 3.34 |
| n-Butane | 8.47 | 8.48 |
| 1-butene | 15.49 | 10.09 |
| Isobutylene | 56.02 | 54.46 |
| Trans 2-butene | 9.23 | 12.44 |
| Cis 2-butene | 6.17 | 10.02 |
| 1,3-butadiene | 0.52 | 0.44 |

Thus, at 355° C., the 1-butene decreased from an initial concentration of about 15.5% to about 10.1% while the 2-butene increased to about 22.5% in the reaction effluent. At 415° C. the 1-butene decreased to about 5.75% and the 2-butene increased 26% in the effluent.

At a space velocity of about 200 and a temperature of about 440° C., the feed begins to undergo cracking, as indicated by a decrease in yield of 2-butene and an increase in methane production. Temperatures higher than 440° C. and/or lower space velocities at 440° C. enhance the cracking.

EXAMPLE 3

Strontium-nickel phosphate catalyst, prepared and dried as in Example 1, was screened to remove a fraction passing a No. 4 screen but retained on a No. 6 screen. Fifteen cc. (7.9 g.) of these particles were packed into a 6 inch by 1 inch diameter Vycor glass reactor having a $5/32$ inch diameter thermowell axially positioned. The reactor was heated electrically and controlled to operate at a series of temperatures while the feed space velocity was maintained at about 200 v./v./h. Percent conversion was calculated as follows:

Percent conversion $$= \frac{(\text{Percent 1-butene in feed}) - (\text{1-butene in product})}{(\text{Percent 1-butene in feed})}$$

| | | Reaction temp., ° C. | | | |
|---|---|---|---|---|---|
| | Feed | 245 | 310 | 360 | 410 |
| Composition: | | | | | |
| Lights | 0.2 | 0.2 | 0.2 | 0.2 | .3 |
| Isobutane | 3.0 | 3.1 | 3.0 | 3.3 | 3.2 |
| n-Butane | 7.7 | 8.0 | 7.8 | 8.1 | 8.4 |
| 1-butene | 21.3 | 19.1 | 12.4 | 8.4 | 9.4 |
| Isobutene | 52.3 | 51.1 | 51.2 | 50.2 | 51.1 |
| Trans 2-butene | 9.1 | 10.6 | 13.8 | 17.0 | 15.7 |
| Cis 2-butene | 5.8 | 7.4 | 11.2 | 12.5 | 11.8 |
| Butadiene | 0.5 | 0.5 | 0.4 | 0.2 | 0.3 |
| Conversion, percent | | 9.6 | 41.6 | 60.1 | 56.7 |

The data show that at the space velocity of these runs, conversion of 1-butene to 2-butene is at its peak at a temperature between 310–410° C. and selectivity to 2-butene is greatest in the 310–360° C. range.

What is claimed is:

1. A method of isomerizing 1-butene to 2-butene comprising passing a mixture of C$_4$ hydrocarbons containing said butenes over a strontium-nickel phosphate catalyst, at a temperature of from about 150° to about 440° C. and at a space velocity of from about 25 to about 800 v./v./h. (STP) with the proviso that as temperature increases, space velocity also is increased.

2. The method of Claim 1 in which the C$_4$ mixture is a mixture of 1-butene, 2-butene, isobutylene and n-butane with only small amounts of butadiene.

3. The method of Claim 1 in which the temperature is from about 260° to about 410° C. and the space velocity ranges from about 175 to about 225 v./v./h.

4. The method of Claim 1 in which the space velocity ranges from about 190 to about 200 v./v./h. and the temperature ranges from about 350° to about 410° C.

5. The method of Claim 1 in which the catalyst contains up to about two weight percent of Cr$_2$O$_3$.

6. The method of Claim 5 in which the catalyst is in pellet form.

7. The method of Claim 5 in which the catalyst has a particle size of from about 4–6 mesh.

References Cited

UNITED STATES PATENTS

| 2,926,207 | 2/1960 | Folkins et al. | 252—437 |
| 3,541,172 | 11/1970 | Stowe et al. | 260—669 |

DELBERT E. GANTZ, Primary Examiner

V. O'KEEFE, Assistant Examiner

PO-1050
(5/69)

UNITED STATES PATENT OFFICE
CERTIFICATE OF CORRECTION

Patent No. 3,830,870                    Dated August 20, 1974

Inventor(s) Mark A. Harter (deceased), John R. Frost, Robert A. Stowe

It is certified that error appears in the above-identified patent and that said Letters Patent are hereby corrected as shown below:

Col. 2, line 31, delete "3700" and insert --3730--.

Col. 3, in the/Table, under the heading "Component", the second line, delete "Isobutene" and insert --Isobutane--. (first)

Col. 3, in the second Table, under the heading "Reaction temp., °C.", under the subheading "410" delete the first four numbers, i.e., ".3", "3.2", "8.4" and "9.4" and insert --.4--, --3.4--, --8.3--, --9.2-- respectively.

Signed and sealed this 26th day of November 1974.

SEAL)
ttest:

cCOY M. GIBSON JR.                C. MARSHALL DANN
ttesting Officer                   Commissioner of Patents